June 23, 1970  D. W. BRYER ET AL  3,516,640
BUTTERFLY VALVE
Filed Sept. 6, 1967  5 Sheets-Sheet 1
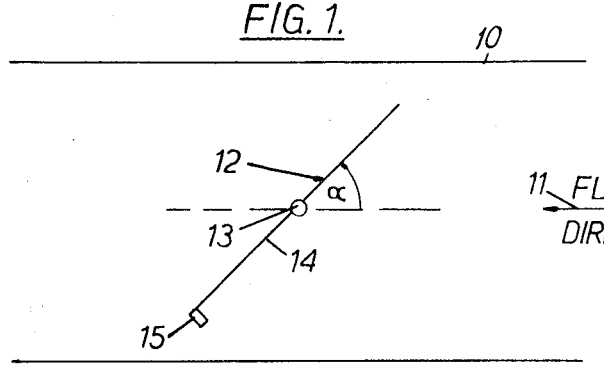
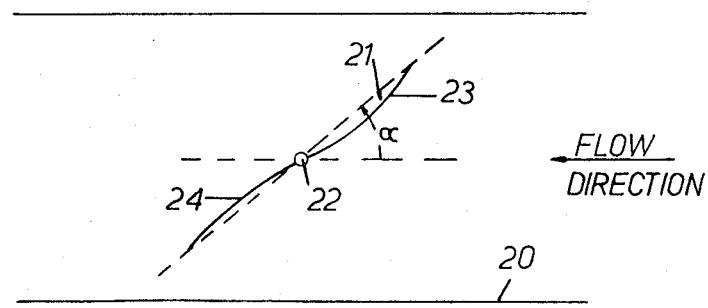
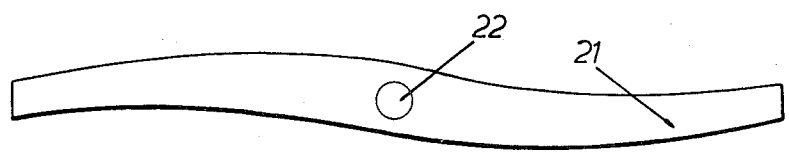

June 23, 1970  D. W. BRYER ET AL  3,516,640
BUTTERFLY VALVE
Filed Sept. 6, 1967  5 Sheets-Sheet 2
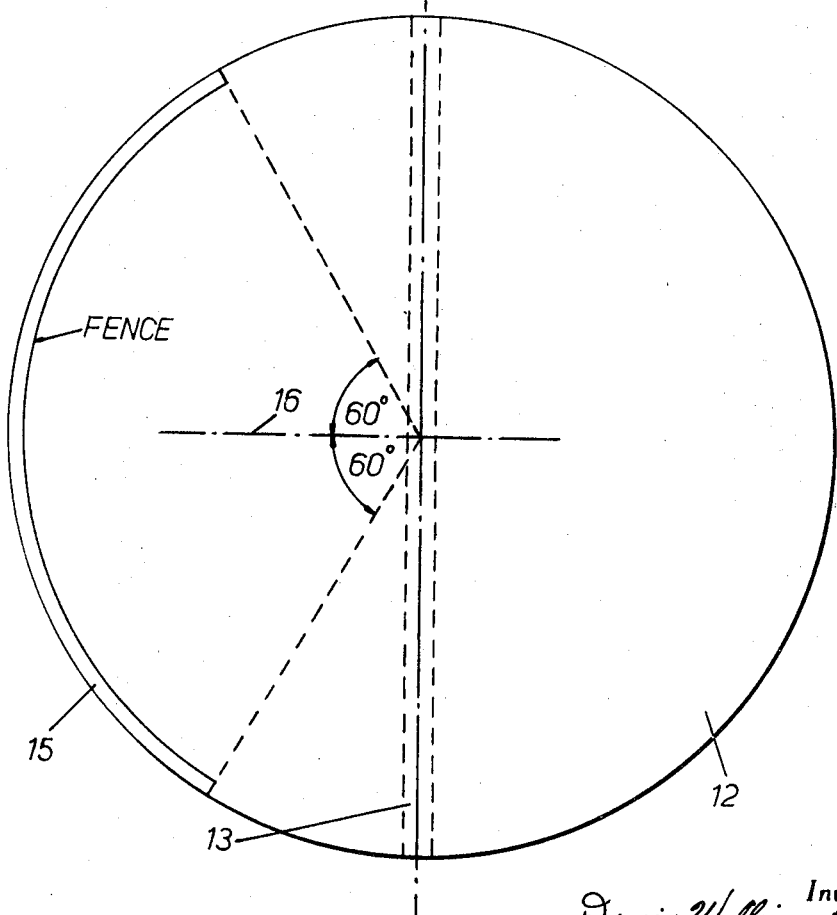

June 23, 1970  D. W. BRYER ET AL  3,516,640
BUTTERFLY VALVE
Filed Sept. 6, 1967
5 Sheets-Sheet 3
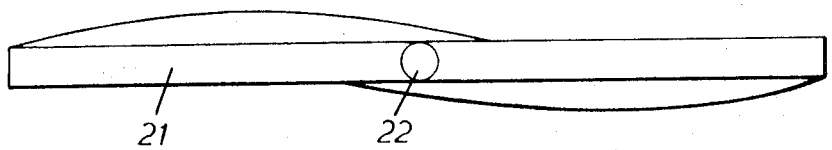
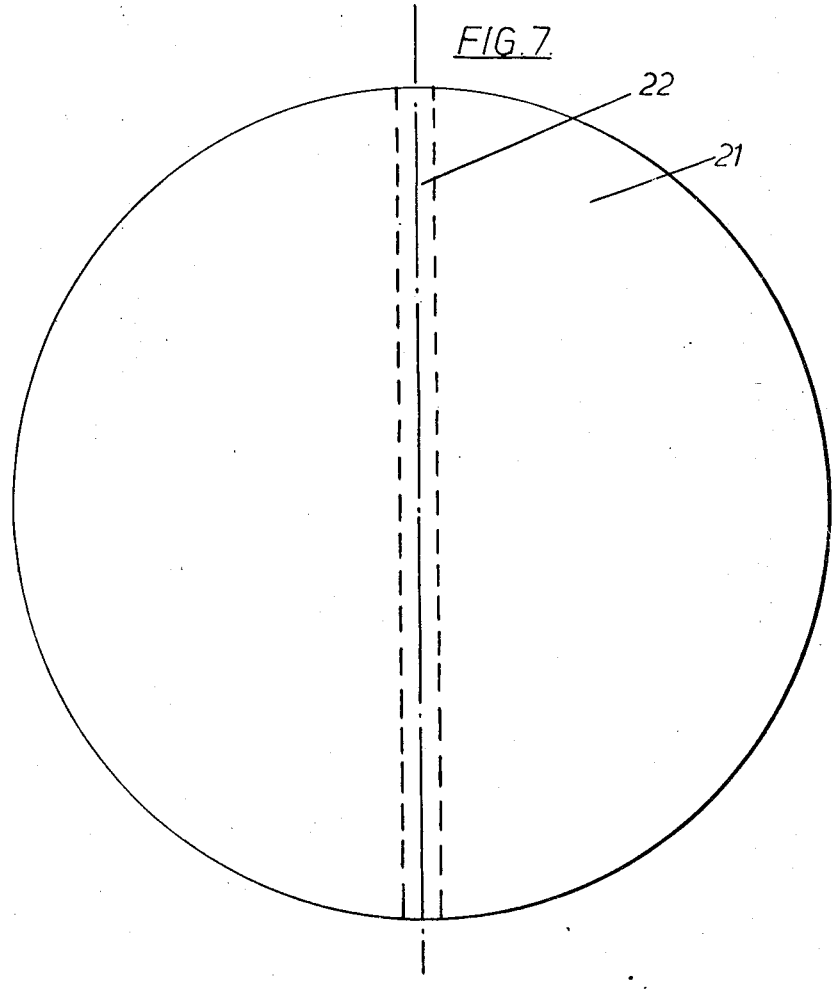

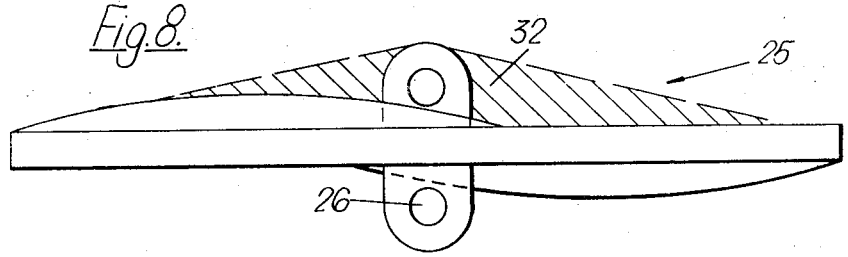
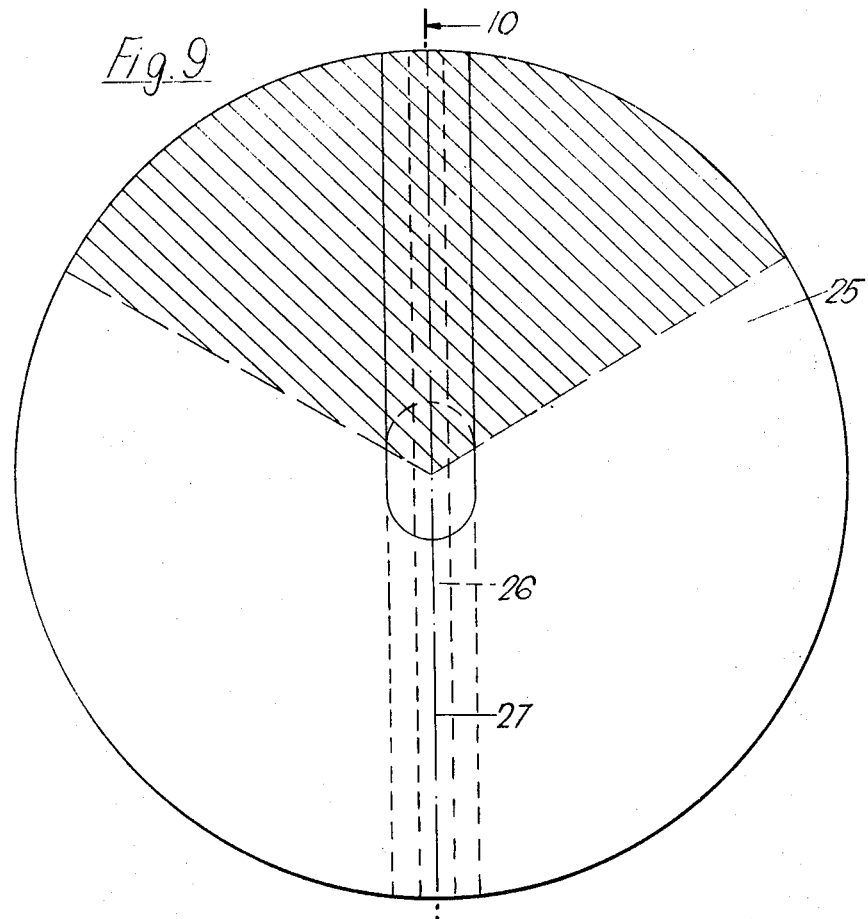
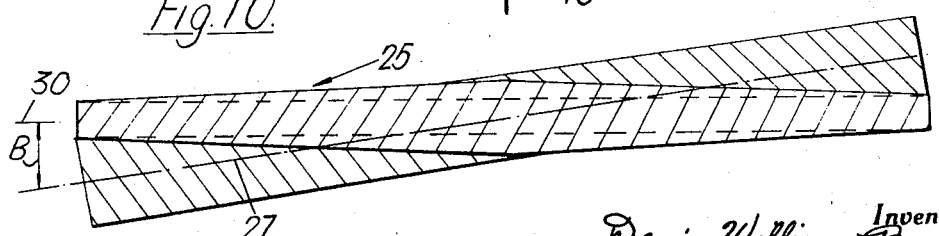

June 23, 1970  D. W. BRYER ET AL  3,516,640
BUTTERFLY VALVE
Filed Sept. 6, 1967  5 Sheets-Sheet 5
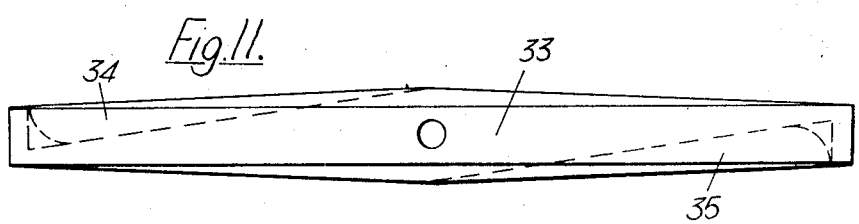
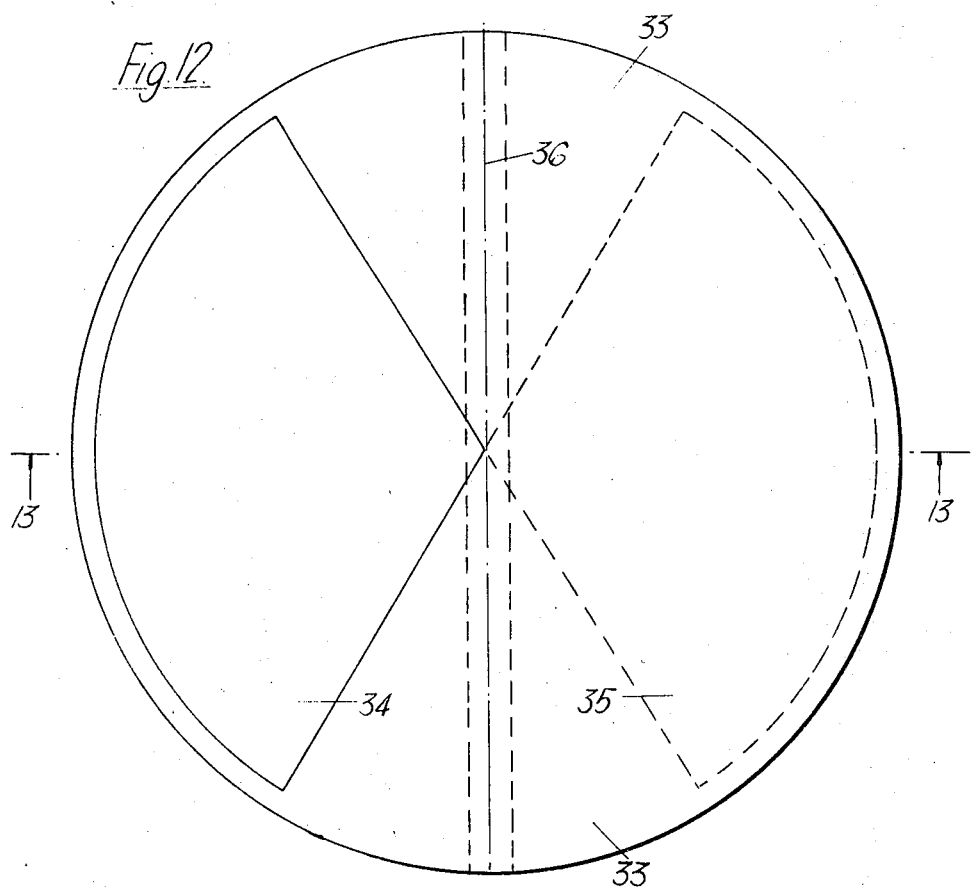
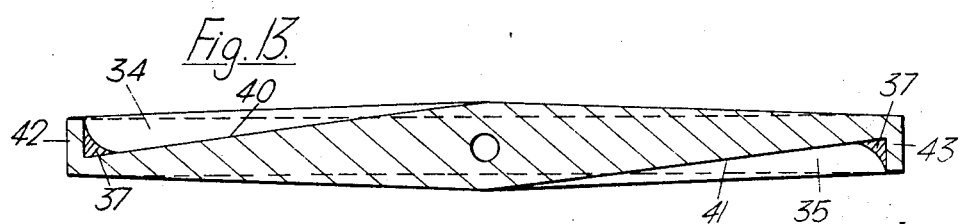

United States Patent Office 3,516,640
Patented June 23, 1970

3,516,640
BUTTERFLY VALVE
Denis William Bryer and Denis Eugene Joseph Walshe, Teddington, England, assignors to National Research Development Corporation, London, England, a British corporation
Filed Sept. 6, 1967, Ser. No. 665,909
Int. Cl. F16k 1/22, 39/00
U.S. Cl. 251—305           12 Claims

ABSTRACT OF THE DISCLOSURE

A butterfly valve is cambered or provided with one or more peripheral flanges which modify the surface pressure distribution over the valve so as to reduce the torque in a closing direction to which the valve is subjected in operation.

---

This invention concerns a butterfly valve.

According to the present invention, there is provided a butterfly valve which is formed or provided with means which, at least throughout a substantial angular range, reduce the torque in a closing direction to which the valve is subjected in operation.

Butterfly valves are, in operation, normally subjected to a torque which tends to close the valve and which varies considerably with the angle of opening of the valve. Both the magnitude of this torque and its non-linearity cause difficulties in the operation of a servo control system incorporating a butterfly valve, and it will be appreciated that these difficulties are reduced by the present invention.

The said angular range preferably constitutes at least the major part of the angular range throughout which the valve may be moved.

Thus the valve may be formed or provided with means for modifying the surface pressure distribution thereover whereby to produce a torque opposing the said closing torque.

The means for modifying the surface pressure distribution preferably comprises at least one peripheral flange or projection. Thus the valve may be provided with a said flange or projection at the upstream face of the valve.

The valve may indeed be provided with a said flange or projection on each of its opposite sides. The flanges or projections may, moreover, be diametrically spaced apart on opposite sides of the axis of rotation of the valve.

The or each peripheral flange or projection may extend throughout a minor portion only of the periphery of the valve, e.g. through 60° on either side of the centre line chord.

The ratio of the height of the flange to the diameter of the valve may be in the range 0.025:1 to 0.070:1.

Alternatively, or additionally, the valve may be cambered to modify the said surface pressure distribution thereover. Thus the leading and trailing halves of the valve may be respectively provided with opposite cambers.

The valve may, moreover, be recessed on each of its opposite sides so that each said side is provided both with a cambered portion and with a said peripheral flange. The axis of rotation of the valve may be inclined to the median plane of the valve.

The invention also comprises a fluid conduit in which is pivotally mounted a butterfly valve as set forth above.

The invention is illustrated, merely by way of example, in the accompanying drawings:

FIG. 1 is a diagrammatic representation of a conduit containing a butterfly valve in accordance with the present invention, FIGS. 2 and 3 are respectively a side view and a plan view of the butterfly valve shown in FIG. 1, FIG. 4 is a diagrammatic view of a conduit containing another butterfly valve in accordance with the present invention, FIG. 5 is a section through the butterfly valve of FIG. 4, the section being taken at right angles to its axis of rotation, FIGS. 6 and 7 are respectively a side view and a plan view of the butterfly valve of FIG. 4, FIGS. 8, 9 and 10 are respectively a side view, a plan, and a section taken on the line 10—10 of FIG. 9, of another butterfly valve in accordance with the present invention, and FIGS. 11, 12 and 13 are respectively a side view, a plan, and a section taken on the line 13—13 of FIG. 12 of yet another butterfly valve in accordance with the present invention.

In FIG. 1 there is shown a fluid conduit 10, e.g. for gas flow therethrough in the direction of arrow 11, the flow through the conduit 10 being controlled by a disc-shaped butterfly valve 12. The butterfly valve 12 is mounted on a pivot 13 and is movable, by means not shown, through a series of angles to vary the flow through the conduit 10.

As so far described, the butterfly valve 12 is of well known form and, as will be seen from FIG. 1, the fluid flow through the conduit 10 will subject the butterfly valve 12 to torque in a valve closing direction. As the angle α alters, this torque will vary considerably in magnitude, the variation being non-linear. Notwithstanding this disadvantage, butterfly valves are frequently chosen to control flow through conduits because they are mechanically suited to rapid operation and introduce only small head losses when fully opened.

In order to reduce this closing torque, the butterfly valve 12 is provided on the leading half of the upstream face 14 with a peripheral flange 15. The flange 15 imparts a drag to the fluid passing through the conduit 10 and gives higher local pressures at the flange 15 which produce a torque opposing the said closing torque.

As will be seen from FIG. 3, the flange 15 extends through 60° only on either side of the centreline chord 16 of the butterfly valve 12.

In one practical example of butterfly valve of the form shown in FIGS. 1–3, the closing torque was reduced considerably when α had a value between 0° and 50° and was slightly increased when α had a value between 50° and 80°. Not merely therefore does the provision of the peripheral flange 15 reduce the closing torque throughout a substantial angular range of the butterfly valve 12, but it also somewhat reduces the extent to which there is a change of torque with change in the value of the angle α.

The provision of the flange 15 somewhat reduces, of course, the maximum delivery through the conduit 10 but this reduction need only be of the order of 7% or less.

The extent to which the closing torque is reduced depends upon the ratio of the height of the flange 15 to the diameter of the valve 12, and we have found that a convenient value for this ratio is within the range 0.025:1 to 0.070:1.

In FIG. 4 there is shown an alternative embodiment of the present invention which is more suitable than the embodiment shown in FIGS. 1–3 for use with fluids containing suspended solid material. In the FIG. 4 embodiment, a conduit 20 has a butterfly valve 21 mounted therein on a pivot 22. The leading and trailing halves 23, 24 of the butterfly valve 21 are, as shown diagrammatically in FIG. 4, respectively provided with opposite cambers. This reduces the closing torque by modification of the surface pressure distribution over the butterfly valve 21.

The butterfly valve 21 may have circular-arc cambers of 0.025C where C is the length of a chord of a valve at right angles to the axis of rotation and in the centre plane of the disc diameter of the valve. The valve 21 may also have a thickness distribution normal to the chord of $$\frac{t}{2} + \frac{0.25}{D}\left(\frac{C}{2} - x\right)$$

where $t$ is the thickness of the butterfly valve 21 at the perimeter thereof, D is the diameter of the buterfly valve 21, and $x$ is the distance along a chord measured from the centre of the chord to the perimeter. As shown in FIG. 5, the resulting shape ensures both an adequate thickness at the pivot 22 and a uniform edge thickness which may be the same as that of a conventional valve.

The butterfly valve shown in FIGS. 4–7 produces as good a reduction in the closing torque as does the embodiment of FIGS. 1 to 3, but not only maintains this reduction throughout the whole angular range of the butterfly valve, but also may be arranged to produce a reduction in maximum delivery of, for example, only 2%.

A butterfly valve as shown in FIGS. 4–7 may, moreover, be provided with a flange 15 as shown in FIGS. 1–3, and the ratio of the height of the said flange to the diameter of the valve may, for example, be 0.043:1. Such a valve may have a closing torque of only 30% that of a conventional valve, and provide a reduction in maximum delivery of 7%.

In FIGS. 8–10 there is shown a cambered butterfly valve 25 which is generally similar to that of FIGS. 4–7 and which will not therefore be described in detail. The butterfly valve 25, however, is mounted on an inclined pivot 26 such that the axis of rotation 27 is inclined at a small angle $\beta$ (e.g. of less than 15°) to the median plane 30 of the valve. This enables the butterfly valve 25 to be sealed around its periphery by an O-ring (not shown).

The butterfly valve 25 may also be provided on its upstream side (and, if desired on its downstream side as well) with in-filling material 32 so as to fair in the bulge created by the pivot 26.

In FIGS. 11–13 there is shown a cambered butterfly valve 33 which is provided on its opposite sides with sector-shaped recesses 34, 35, the recesses 34, 35 being diametrically spaced apart on opposite sides of the axis of rotation 36 of the butterfly valve 33. The sector-shaped recesses 34, 35 extend from the centre of the butterfly valve 33 to a region adjacent to, but spaced from, the periphery of the butterfly valve 33, the depth of each said recess increasing towards the said periphery. Accordingly the recesses 34, 35 provide the butterfly valve 33 both with cambered portions 40, 41 and with peripheral flanges 42, 43. Thus the butterfly valve 33 is cambered on each of its sides and has flanges 42, 43 which are diametrically spaced apart on opposite sides of the axis of rotation 36 and which are respectively disposed on opposite sides of the valve.

If desired, in-filling material 37 may, as shown, be employed to provide a radiused fillet at the deepest portions of the recesses 34, 35.

The butterfly valve 33 is equally effective for both directions of flow. The flange 43 in the upstream side of the valve, moreover, has the effect of improving the performance of the valve in both directions of flow. However, the cambered portion 41 on the upstream side of the valve has been found to have a smaller effect on the performance of the valve than the cambered portion 40 on the downstream side of the valve.

If desired the butterfly valve 33, which is capable of easy production by casting, may be provided with an inclined pivot as in the construction of FIGS. 8–10.

We claim:

1. A butterfly valve comprising a conduit, a valve member pivotally mounted therein about a pivot axis, the valve member having an upstream-facing surface and a downstream-facing surface on each of which is disposed a respective flange or projection, each said flange or projection extending around a respective part only of the edge of the respective surface, each said part being spaced from the pivot axis, the said part of the edge of the upstream-facing surface being a part of the edge thereof which is a trailing edge when the valve is open, the flanges reducing, at least throughout a substantial range of angular positions of the valve member about the pivot axis, the torque in a closing sense to which the valve member is subjected by fluid pressure when in operation.

2. A valve as claimed in claim 1 in which the said angular range constitutes at least the major part of the angular range throughout which the valve may be moved.

3. A valve as claimed in claim 1 in which each flange or projection throughout a minor portion only of the edge of the respective surface.

4. A valve as claimed in claim 3 in which each flange or projection extends through 60° on either side of a centreline chord perpendicular to the pivot axis.

5. A valve as claimed in claim 1 in which the valve member is circular and the ratio of the diameter of the valve to the height of the flanges is in the range 1:025 to 1:0.070.

6. A valve as claimed in claim 1 in which a surface of the valve is cambered to modify the surface pressure distribution thereover, whereby to produce a torque opposing said closing torque.

7. A valve as claimed in claim 6 in which the opposite surfaces of the valve are respectively provided with cambers.

8. A valve as claimed in claim 6 in which the valve is recessed on each of its said opposite surfaces so that each of said opposite surfaces is provided both with a cambered portion and with a said flange.

9. A valve as claimed in claim 1 in which the pivot axis of the valve is inclined to the median plane of the valve.

10. A valve as claimed in claim 1 wherein the flange or projection on the downstream-facing surface is disposed at a part of the edge thereof which is a leading edge when the valve is open.

11. A valve as claimed in claim 10 wherein said flange or projection on the downstream-facing surface is diametrically opposite the flange or projection on the upstream-facing surface.

12. A valve as claimed in claim 1 wherein a said flange has a bluff surface on a side thereof facing away from the pivot axis.

References Cited

UNITED STATES PATENTS

| 624,836 | 5/1899 | Marsh | 251—305 X |
|---|---|---|---|
| 1,402,824 | 1/1922 | Wood | 251—308 XR |
| 2,095,263 | 10/1937 | Moss | 251—305 X |
| 2,114,168 | 4/1938 | Augur | 251—305 |
| 3,029,063 | 4/1962 | Moen | 251—306 |
| 3,049,335 | 8/1962 | Daumy et al. | 251—305 |
| 3,053,543 | 9/1962 | Kallin | 251—306 X |
| 3,176,704 | 4/1965 | De Palma | 251—305 X |

FOREIGN PATENTS

| 670,327 | 1/1939 | Germany. |
|---|---|---|
| 983,179 | 2/1965 | Great Britain. |
| 1,166,545 | 5/1961 | France. |
| 1,233,654 | 5/1960 | France. |

HENRY T. KLINKSIEK, Primary Examiner

U.S. Cl. X.R.

251—281